United States Patent
Abeta et al.

(10) Patent No.: US 8,376,730 B2
(45) Date of Patent: Feb. 19, 2013

(54) METHOD OF CLAMPING MATERIAL AND A MATERIAL-CLAMPING UNIT USED THEREFOR

(75) Inventors: Hiroshi Abeta, Toyokawa (JP);
Yasuhiro Oyaizu, Toyokawa (JP);
Hiroyuki Itakura, Toyokawa (JP)

(73) Assignee: Sintokogio, Ltd., Aichi (JP)

( * ) Notice: Subject to any disclaimer, the term of this patent is extended or adjusted under 35 U.S.C. 154(b) by 639 days.

(21) Appl. No.: 12/187,947

(22) Filed: Aug. 7, 2008

(65) Prior Publication Data
US 2009/0104300 A1    Apr. 23, 2009

(30) Foreign Application Priority Data
Oct. 23, 2007  (JP) ................................. 2007-274678

(51) Int. Cl.
*B29C 51/26* (2006.01)
(52) U.S. Cl. .................. 425/397; 425/400; 425/DIG. 48
(58) Field of Classification Search ........... 425/DIG. 48, 425/397, 388, 398, 140, 145, 400
See application file for complete search history.

(56) References Cited

U.S. PATENT DOCUMENTS 3,910,747 A * 10/1975 Dean et al. .................... 425/397
4,170,449 A * 10/1979 Shuman ........................ 425/445
6,361,304 B1 * 3/2002 Petersen ........................ 425/193
6,382,953 B1 * 5/2002 Chun et al. .................... 425/397

FOREIGN PATENT DOCUMENTS
JP    8-112869    5/1996
* cited by examiner

*Primary Examiner* — James Mackey
(74) *Attorney, Agent, or Firm* — Finnegan, Henderson, Farabow, Garrett & Dunner, L.L.P.

(57) ABSTRACT

A material clamping unit and a method for clamping material, wherein a product having no creases can be manufactured, even if the material has a complex shape, and the method can improve a yield of the product, and can reduce the cost of the dies. The method of clamping materials is for a forming machine that will form thermoplastic sheet material by an upper and a lower die, which sheet material is heated in advance to a predetermined temperature in heating furnace, and thus softened, comprising the steps of: holding both edges of the sides in the running direction of the thermoplastic sheet material, and then transferring the material between the upper die and the lower die of the forming machine: holding the rear and front edges of the sides of the thermoplastic sheet material, which sides are perpendicular to the running direction of the thermoplastic sheet material; and lowering the edges of the sides in the running direction of the thermoplastic sheet material and the rear and front edges of the sides of the thermoplastic sheet material, which sides are perpendicular to the running direction of the thermoplastic sheet material, so that the sheet material will fit in the upper die.

2 Claims, 12 Drawing Sheets

METHOD OF CLAMPING MATERIAL AND A MATERIAL-CLAMPING UNIT USED THEREFOR

FIELD OF THE INVENTION

This invention relates to a method for clamping material and a material-clamping unit used therefor. Specifically, the invention relates to a method for clamping material to be used for a forming machine that forms thermoplastic sheet material, which material is heated to a predetermined temperature in advance in a heating furnace and softened, by an upper and a lower die by thermoforming or vacuum forming. Also, it relates to the material-clamping unit used therefor.

BACKGROUND

Conventionally, there is an invention that is directed to a method of forming a laminate, wherein the laminate is formed by press-forming thermoplastic sheet material and a fibrous substrate, which is then formed into a desired form. The method comprises the steps of:

after clamping both edges of the two longer sides of the thermoplastic sheet material with a pair of clamping devices, heating it to a predetermined temperature in a heating furnace, and softening it;

fixing a position of the thermoplastic sheet material which is in a softened state, within a metal die for forming by a cold press, onto the upper surface of the die, on which is set a fibrous substrate at the predetermined position of the die; and releasing the clamping of the clamping device on the edges of one side of the thermoplastic sheet material immediately before the start of the press-forming (when an upper die comes just before the bottom dead point), while having the material clamping device hold the other edges of the side of the thermoplastic sheet material.

(See the patent document Reference 1.)

Also, another piece of forming equipment of the conventional type includes one that forms heated material after the material is transferred from a transfer clamp to actuators for clamping that are disposed around the entire circumference of a lower die.

(The Patent Document Reference 1)
Publication of Patent Application No. H08-112869

DISCLOSURE OF THE INVENTION

Problem to be Solved by the Invention

However, with the aforesaid method there is a problem in that a product (formed product) thus produced is apt to have creases if it has a complex shape, because the clamping of the edges of one side of the sheet material is released.

Also, with an increasing need in recent years to improve the yield of products, the forming method cannot properly meet the need when sheet material of a smaller size is formed by tensile stretching during the pressing.

Further, some equipment of a conventional type has a hoisting mechanism that lifts or lowers each die that is manufactured for each product, and has functions to hold the sheet material and exert tension by the actuators placed around the dies. Each position of the actuators differs, depending on the products. Thus, if the actuators are placed around the entire circumference of the lower die, the number of actuators required is large, which makes the cost of dies higher.

Thus, considering the above problems, the applicant aims to provide a method for clamping material and a material-clamping unit used therefor, wherein the material-clamping unit can manufacture a product that has no creases, even if it has a complex shape, and can improve the yield of the product, and can reduce the cost of the dies.

Means to Solve the Problems

The method for clamping material of the present invention is used for a forming machine that forms thermoplastic sheet material by an upper and a lower dies, which sheet material is heated to a predetermined temperature in advance in a heating furnace, and thus softened, comprising the steps of:

holding both edges of the sides in the direction, in which the thermoplastic sheet material runs (hereafter, running direction), and then transferring the material between the upper die and the lower die of the forming machine;

holding the rear and front edges of the sides of the sheet material, which sides are perpendicular to the running direction of the thermoplastic sheet material; and lowering the edges of the sides in the running direction of the thermoplastic sheet material and the rear and front edges of the sides of the sheet material, which latter sides are perpendicular to the running direction of the thermoplastic sheet material, so that the thermoplastic sheet material will fit into the upper die.

The material-clamping unit of the present invention is used for the method for clamping material, comprising:

a certain number of first clamping means that are disposed along the edges of both sides of the thermoplastic sheet material and that hold the edges of the sides of the thermoplastic sheet material, which sides are in the running direction of the thermoplastic sheet material;

a first clamp-hoisting mechanism that lifts and lowers each of the first clamping means;

a pair of width-clamping devices having a first width-adjusting mechanism that adjusts the width by transferring the first clamp-hoisting mechanism in the direction of the width (hereafter, width direction) that is perpendicular to the running direction of the thermoplastic sheet material;

a certain number of second clamping means that are disposed at the front and rear positions of the lower die of the forming machine, and which hold the edges of the sides of the thermoplastic sheet material, which sides are perpendicular to the running direction of the thermoplastic sheet material;

a second clamp-hoisting mechanism that lifts and lowers each of the second clamping means, a pair of the rear and front clamping devices having a second width-adjusting mechanism that adjusts the rear and front width in the running direction by transferring the second clamp-hoisting mechanism in the running direction of the thermoplastic sheet material;

a transfer mechanism that transfers a pair of the width-clamping devices between the upper and the lower dies of the forming machine; and a control device that controls, based on the shape of the upper die, the movements of a pair of the width-clamping devices and a pair of the rear and front clamping devices.

The material clamping unit of the present invention can manufacture a product that has no creases, even if the product has a complex shape, because the material-clamping unit controls, based on the shape of the upper die, the movements of a pair of the width-clamping devices and a pair of the rear and front clamping devices, both of which pairs are a hoisting-type device.

For example, it holds the thermoplastic sheet material using a pair of the width-clamping devices and a pair of the rear and front clamping devices, and keeps holding it in a movement that is synchronized with the speed at which the upper die is lowered (hereafter, lowering speed) until the upper die reaches the bottom dead point, such that a suitable tension works on the thermoplastic sheet material until the end.

Also, if sheet material of a smaller size is used to improve the yield of products, the heated thermoplastic sheet material can be placed within the lower die because it can be held with a pair of the rear and front-clamping devices, the rear and front width of which is adjustable. Thus in forming the sheet by extending this material of a smaller size outward, it is possible to increase the yield of the product.

Further, unlike a conventional method, the material-clamping unit of the present invention need not transfer the heated thermoplastic sheet material onto the lower die when the material is formed, and also need not use actuators that are disposed around the entire circumference of the lower die and that hold the material. Thus, the number of actuators can be decreased, and the cost of the dies can be reduced.

THE BEST EMBODIMENT FOR CARRYING OUT THE INVENTION

Figure 1:
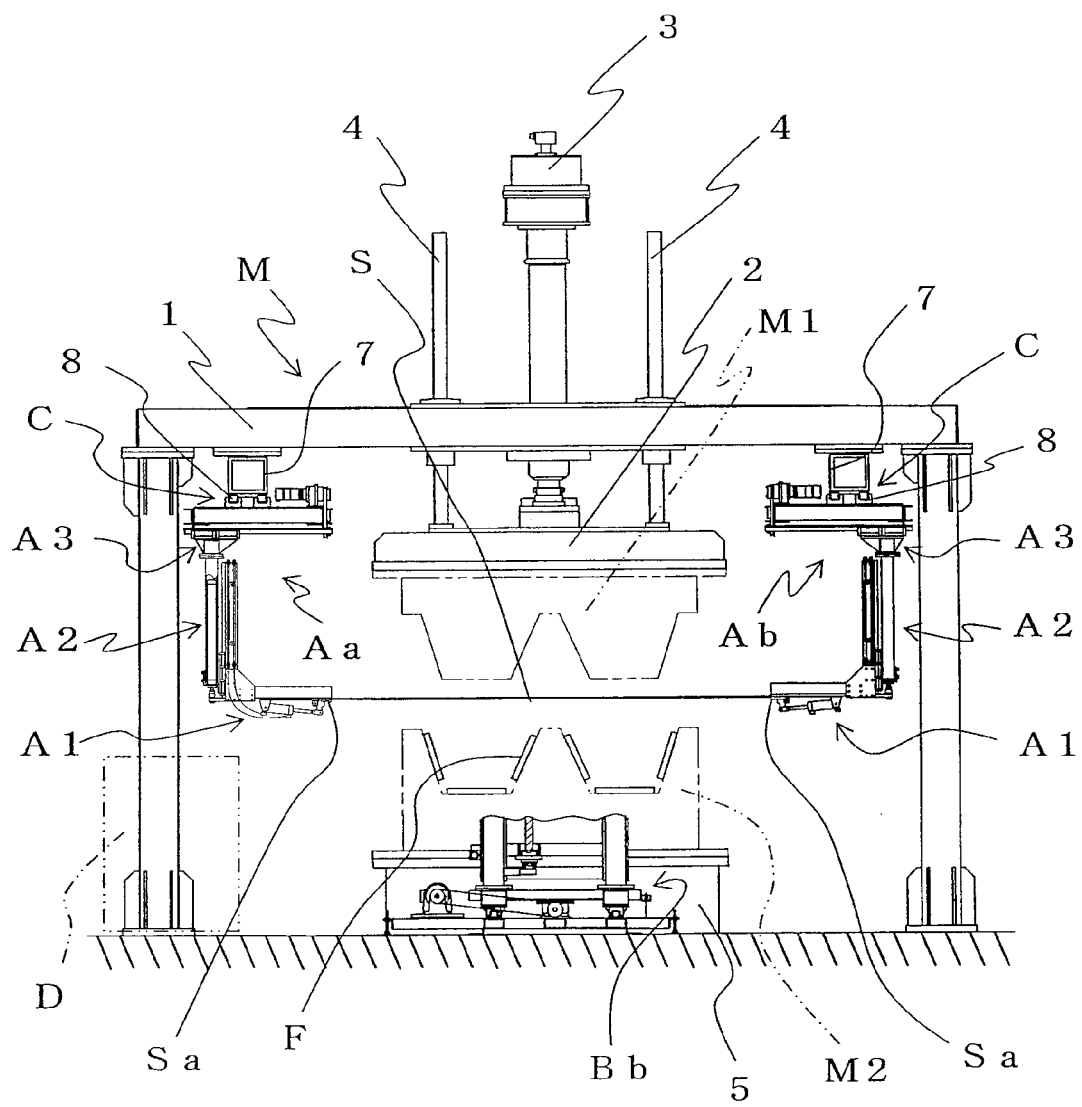
FIG. 1 is a front view of the structure of the material-clamping unit in one embodiment of the invention.
Figure 2:
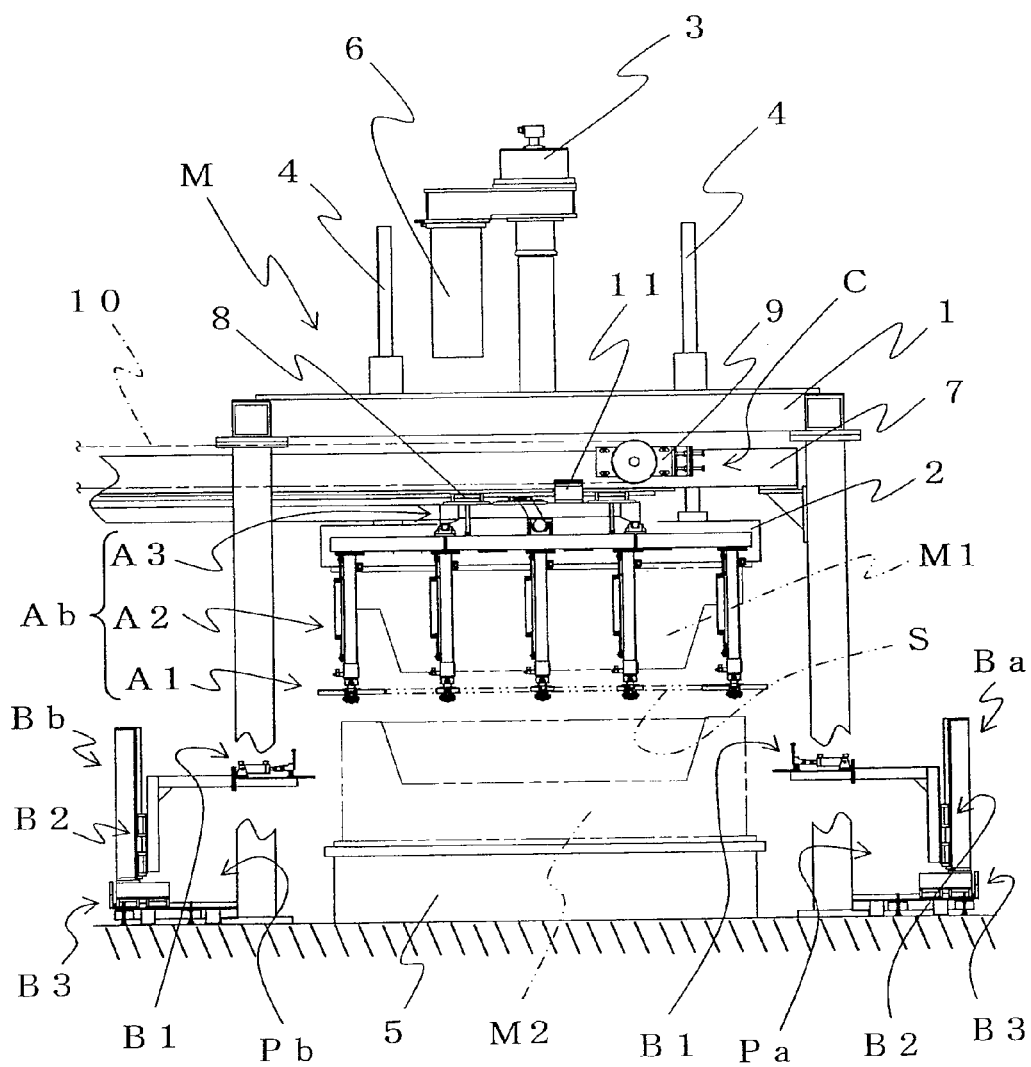
FIG. 2 is a side view of the material-clamping unit of FIG. 1, which shows a position of a width-clamping device relative to a rear and front clamping device.
Figure 3:
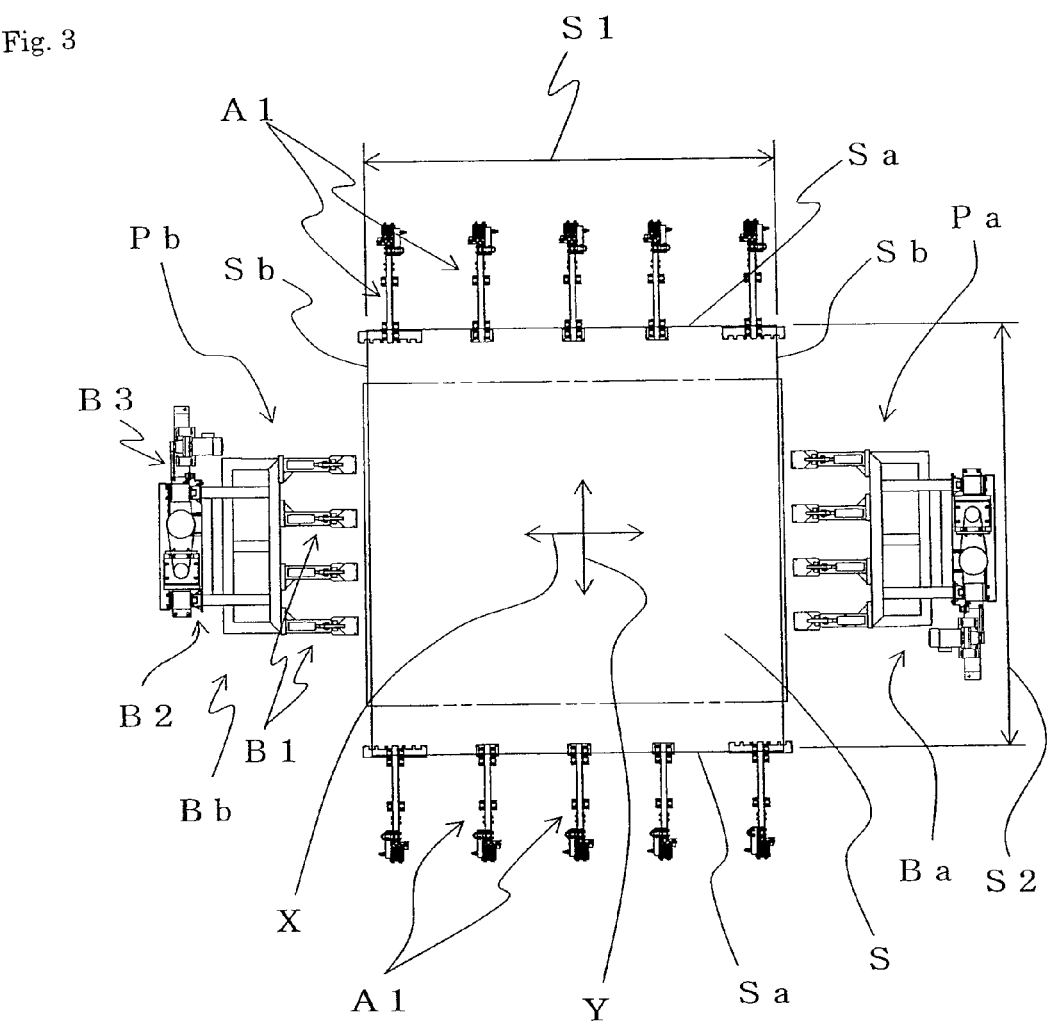
FIG. 3 is a plan view of the material-clamping unit of FIG. 1, which shows a position of the width-clamping device relative to the rear and front clamping device.

In the following, the method for clamping material and the material-clamping unit used therefor, of the present invention, are explained based on the drawings:

In one embodiment of the present invention, as shown in FIGS. 1, 2, and 3, the material-clamping unit of the present invention is used in a forming machine M, which forms the thermoplastic sheet material S, which is heated and softened in advance in the furnace (not shown), with the upper and lower dies M1, M2. It has a pair of the width-clamping devices Aa, Ab and a pair of the rear and front clamping devices Ba, Bb, a transfer mechanism C, and a control device D. The lower die M2 is provided with a piece of felt F as material for a cushion.

In this embodiment of the present invention, the thermoplastic sheet material S, which is rectangular, with the length of its longer side (the rear and front widths) being S1 and the length (width) of its shorter side being S2, is used. But thermoplastic sheet material S that is square can also be used.

A pair of the width-clamping devices Aa, Ab are disposed along the edges Sa of both sides of the thermoplastic sheet material S. A pair of the width-clamping devices Aa, Ab comprises:

a certain number of the first clamping means A1, which hold the edges Sa of the sides of the thermoplastic sheet material S, which sides are in the running direction of the thermoplastic sheet material S, the first clamp-hoisting mechanism A2, which lifts and lowers each of the first clamping means A1, and the first width-adjusting mechanism A3, which adjusts the width by transferring the first clamp-hoisting mechanism A2 in the direction of the width (shown by an arrow in the direction Y) which is perpendicular to the running direction (shown by an arrow in the direction X) of the thermoplastic sheet material S. In the present embodiment, five clamps are provided for the first clamping means.

A pair of the rear and front clamping devices Ba, Bb are disposed at positions Pa, Pb, which are at the front and rear positions of the lower die M2 of the forming machine M. The rear and front clamping devices Ba, Bb comprise:

a certain number of the second clamping means B1, which hold the edges Sb of the sides of the thermoplastic sheet material S, which sides are perpendicular to the running direction of the thermoplastic sheet material S;

the second clamp-hoisting mechanism B2, which lifts and lowers each of the second clamping means B1; and the second width-adjusting mechanism B3, which adjusts the rear and front width in the running direction by transferring the second clamp-hoisting mechanism B2 in the running direction of the thermoplastic sheet material S.

In the embodiment of the present invention, four second clamping means B1 are used. But any transfer mechanism can be used as a transfer mechanism C, if it can transfer a pair of the width-clamping devices between the upper die M1 and the lower die M2 of the forming machine M.

By referring to FIGS. 1-3, the forming machine M, the width-clamping devices Aa, Ab, and the rear and front clamping devices Ba, Bb, are now explained.

The forming machine M of the embodiment of the present invention has, above a gate-type frame 1, an electric actuator 3, which can lift and lower an upper table 2, which table has the upper die M1 fixed to it, and has guide pins 4 on both sides of the actuator 3. Also, below the gate-type frame 1, a lower table 5, which has a lower die M2 fixed to it, is fastened to the floor. Also, the width-clamping devices Aa, Ab are connected to a transfer mechanism C, which is disposed at the lower parts of both sides of the gate-type frame 1. In the present embodiment, if synchronization with a servomotor 105, which will be referred to below, is considered, the motor for the actuator 3 is preferably a servomotor 6. In the present invention, if a general-purpose motor is used in place of a servomotor, an inverter can also be used in place of a servo driver, which is explained below, for the purpose of synchronization.

Also, in the present embodiment, the width-clamping devices Aa, Ab are movably connected to a linear guide 8, which constitutes the transfer mechanism C attached to a pair of frames 7 that are fixedly laid, starting from both sides of the lower surface of the gate-type frame 1 to inside a heating furnace.

Also, the width-clamping devices Aa, Ab are connected to a drive belt 10 that links a driving part (not shown) and a driven part 9, which parts constitute the transfer mechanism C, by a connecting part 11. Thus the width-clamping devices Aa, Ab can move between the forming machine M and the heating furnace (not shown). Also, at the positions Pa, Pb, which are in the front and rear of the lower die M2, are disposed the rear and front clamping devices Ba, Bb, which face each other.

By referring to FIGS. 4-7 a pair of the width-clamping devices Aa, Ab are now explained in detail. In the present embodiment, these clamping devices can have the same structure. So, only the width-clamping device Aa is explained.

Figure 4:
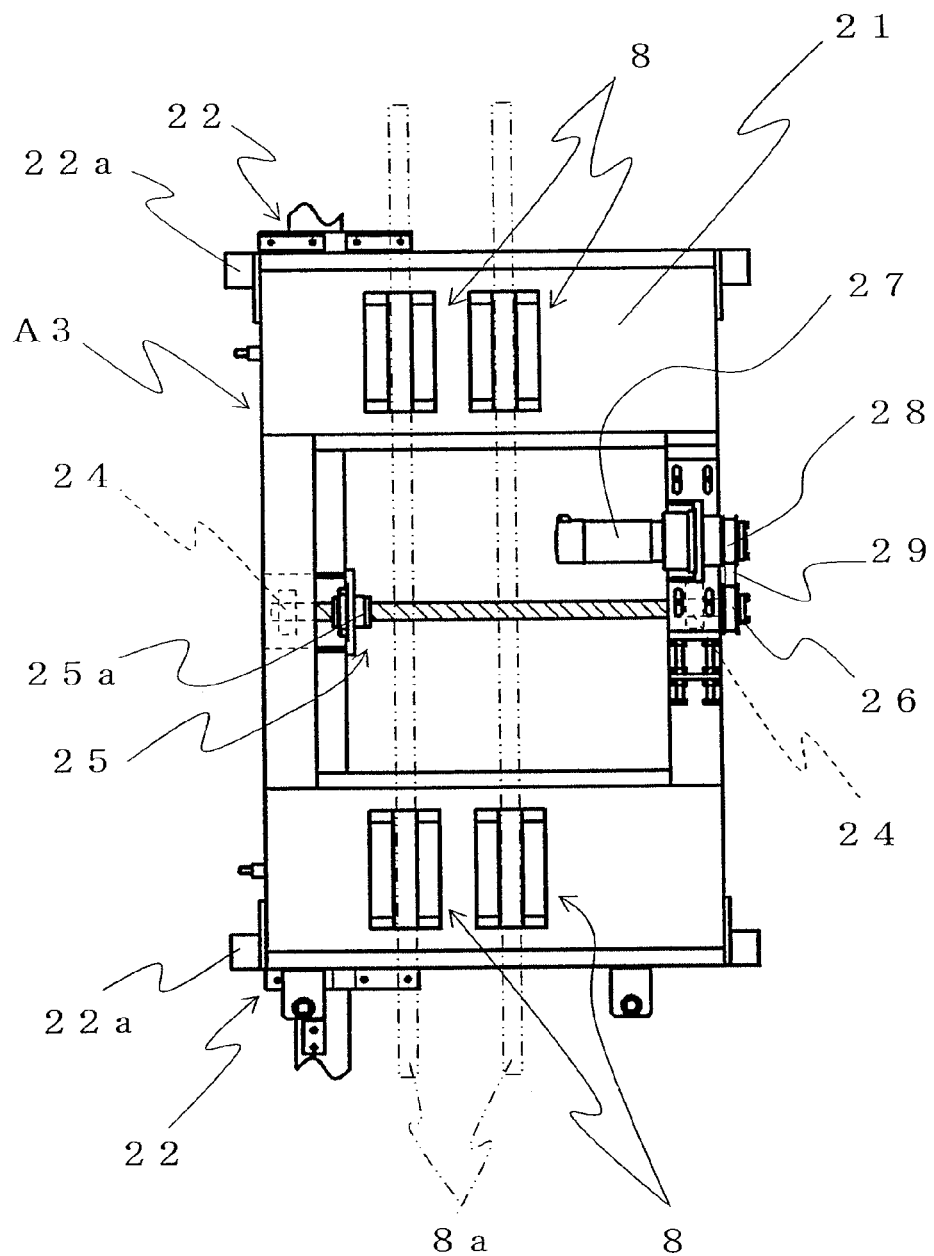
FIG. 4 is a plan view of the first width-adjusting mechanism of the width-clamping device.
Figure 5:
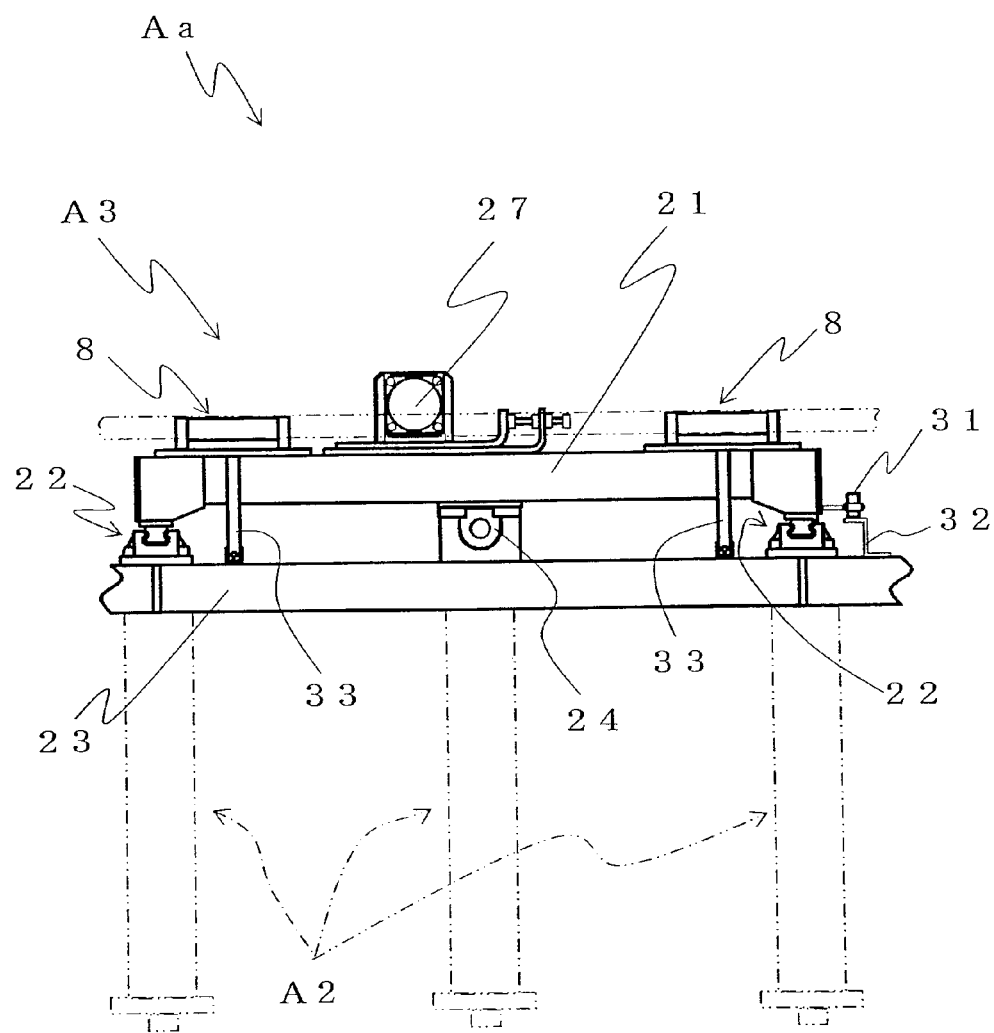
FIG. 5 is a left elevational view of FIG. 4.

As shown in FIGS. 4 and 5, the first width-adjusting mechanism A3 comprises linear guides 22 under both sides of a carriage frame 21, which guides are movably fixed to frame 23 that holds the first clamp-hoisting mechanism A2, and a ball screw mechanism 25 that is supported by two bearings 24 is disposed in the middle of the linear guides 22. A timing belt 29 transmits the driving force of a servomotor 27, which rotates the ball screw mechanism 25 forward and backward, through a belt pulley 26 at the end of the axis of the ball screw mechanism 25 and a belt pulley 28 at the end of the axis of the servomotor 27, which belt pulleys are connected by the timing belt 29. The axis of the ball screw mechanism 25 and that of the belt pulley 26, and the axis of the servomotor 27 and that of the belt pulley 28, are each fastened by a locking means (not shown). A position sensor 31 that detects the initial position and a detection part 32 are installed on the carriage frame 21 and the frame 23 respectively. Symbols 8a and 22a in FIG. 4 denote guide rails for the linear guides 8 and 22. Symbol 33 denotes a stopper. The symbol 25A denotes a nut for the ball screw mechanism 25.

Figure 6:
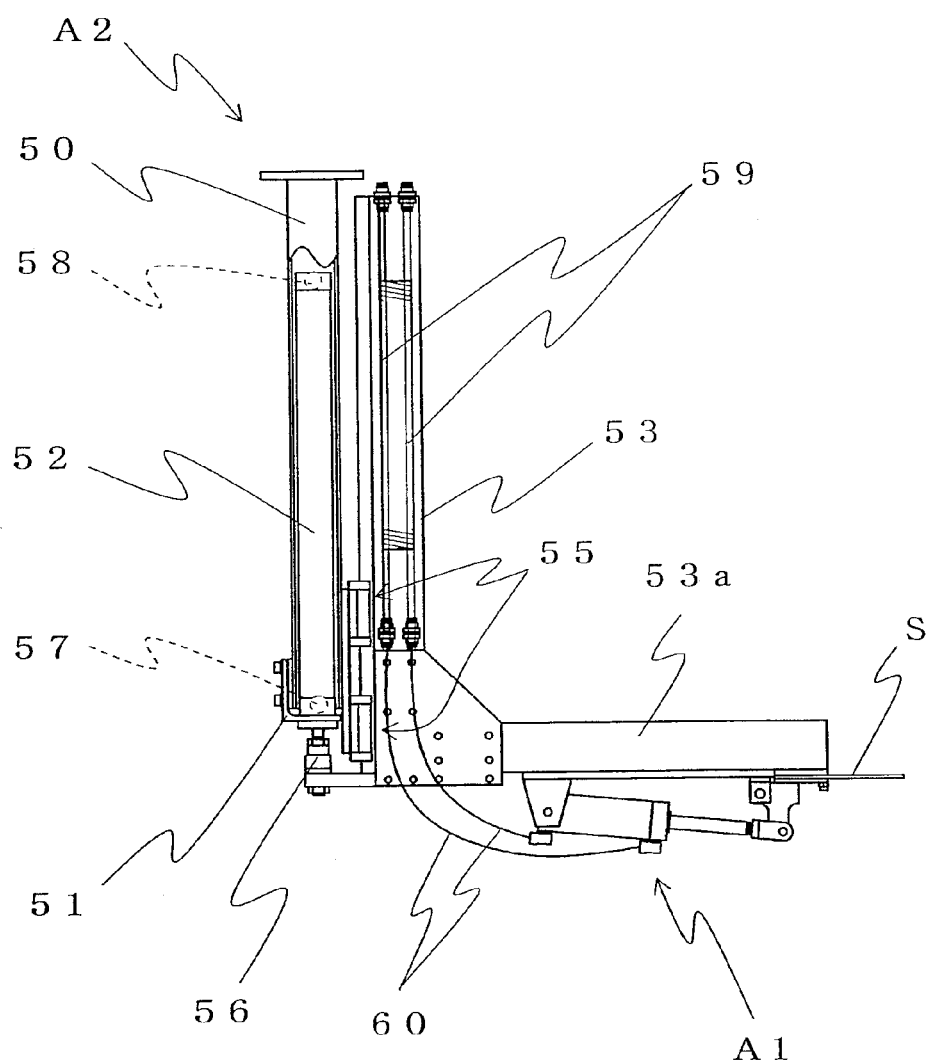
FIG. 6 is a front view of the first clamping means and the first clamp-hoisting mechanism.
Figure 7:
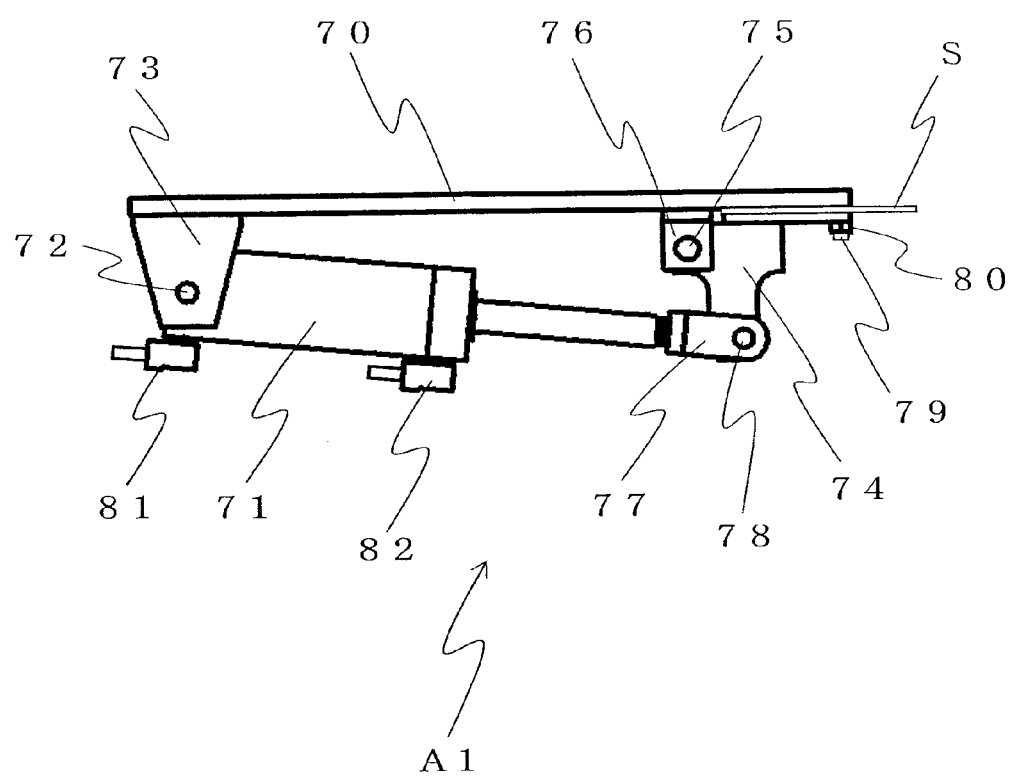
FIG. 7 is an enlarged view of the first clamping means.
Figure 8:
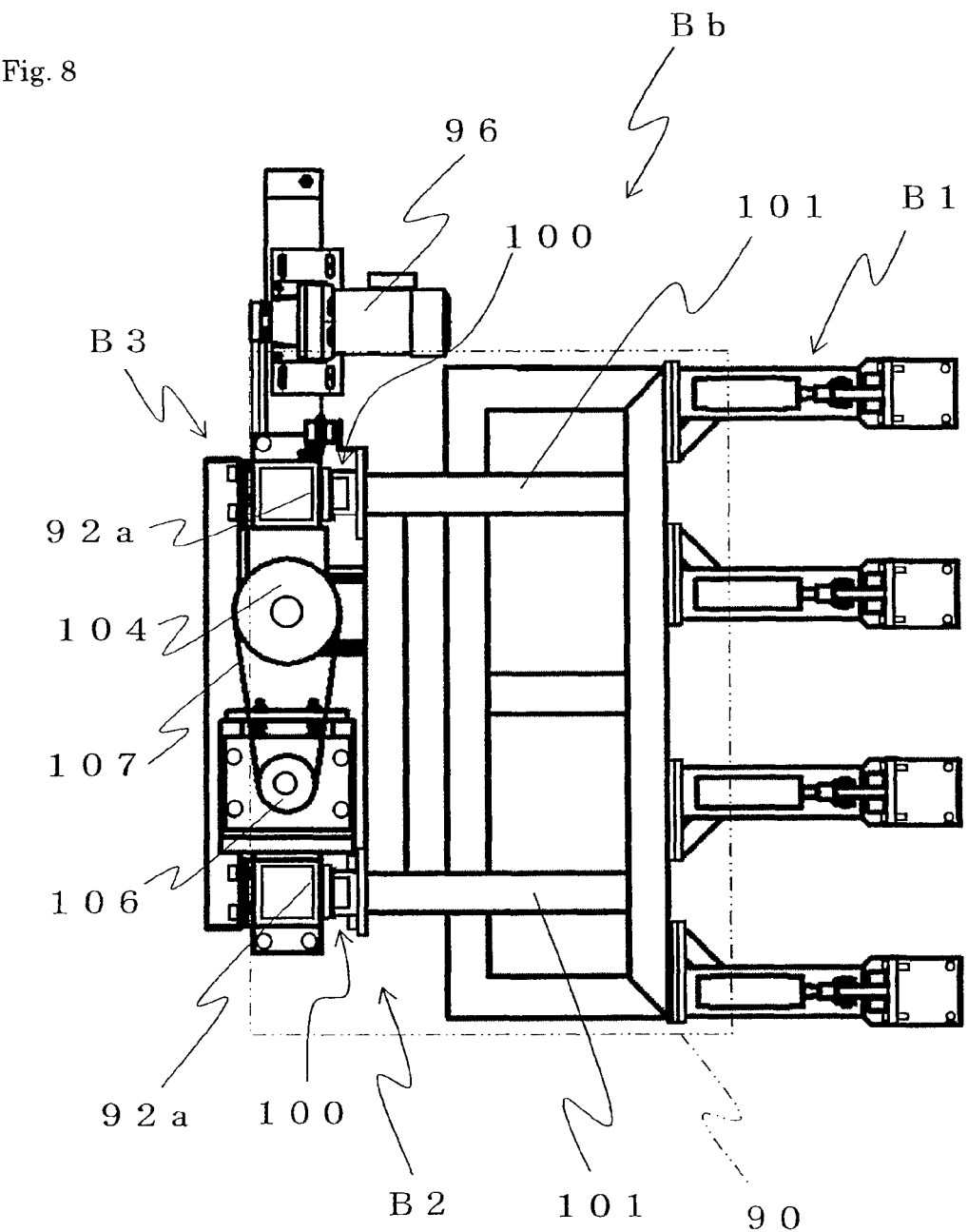
FIG. 8 is a plan view of the rear and front clamping device.
Figure 9:
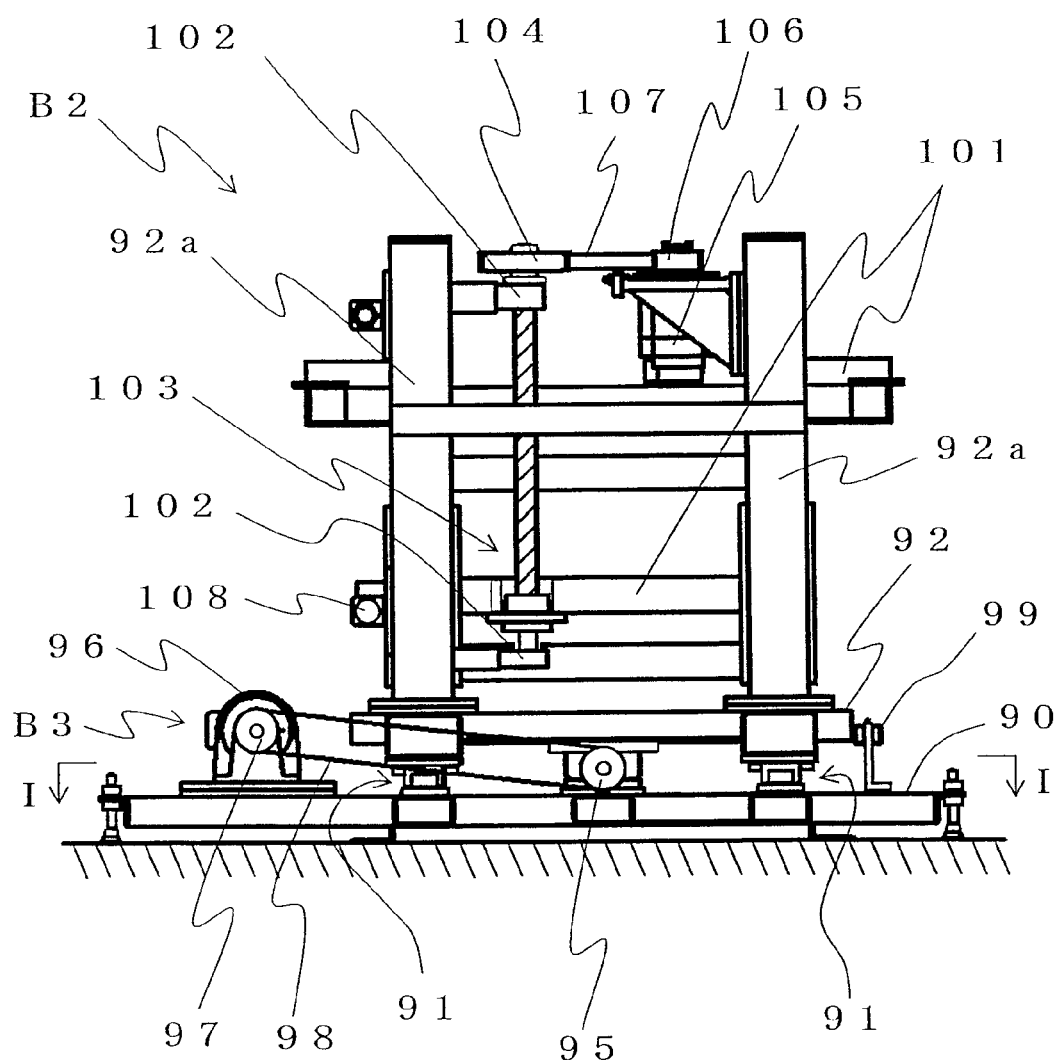
FIG. 9 is a front view of FIG. 8.
Figure 10:
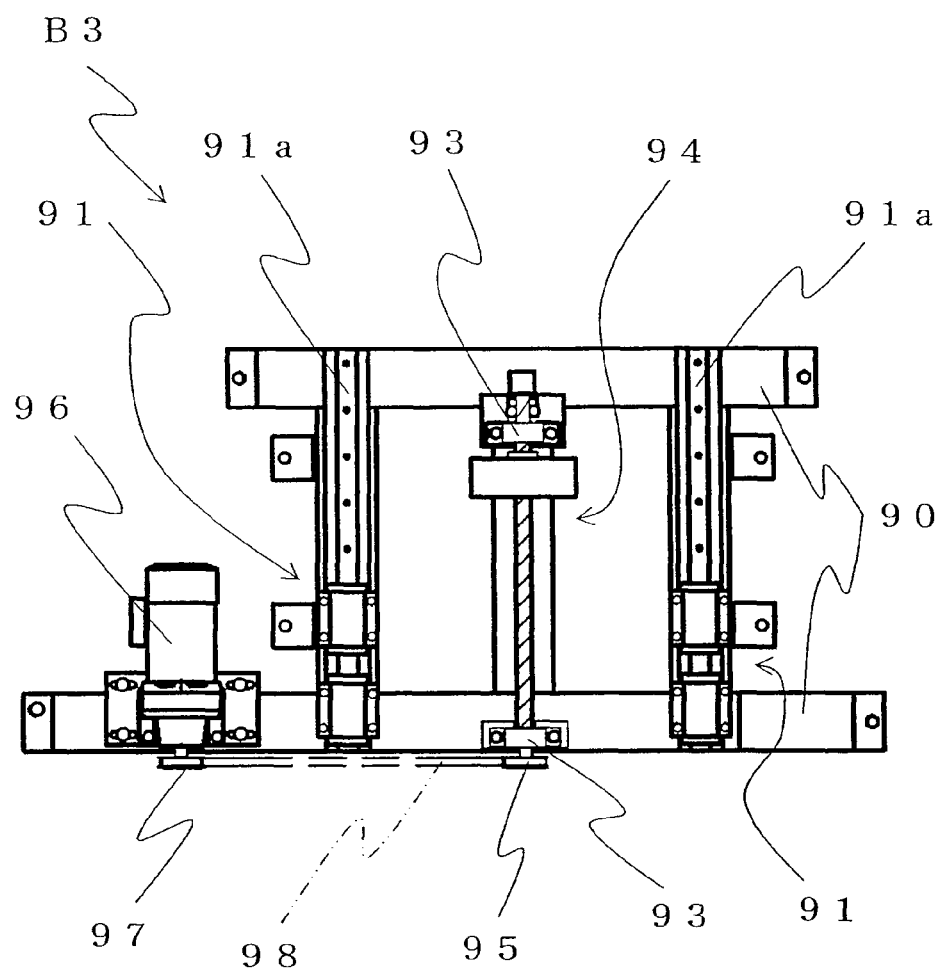
FIG. 10 is a cross-sectional view of the rear and front clamping device of FIG. 9 along the line I-I.
Figure 11:
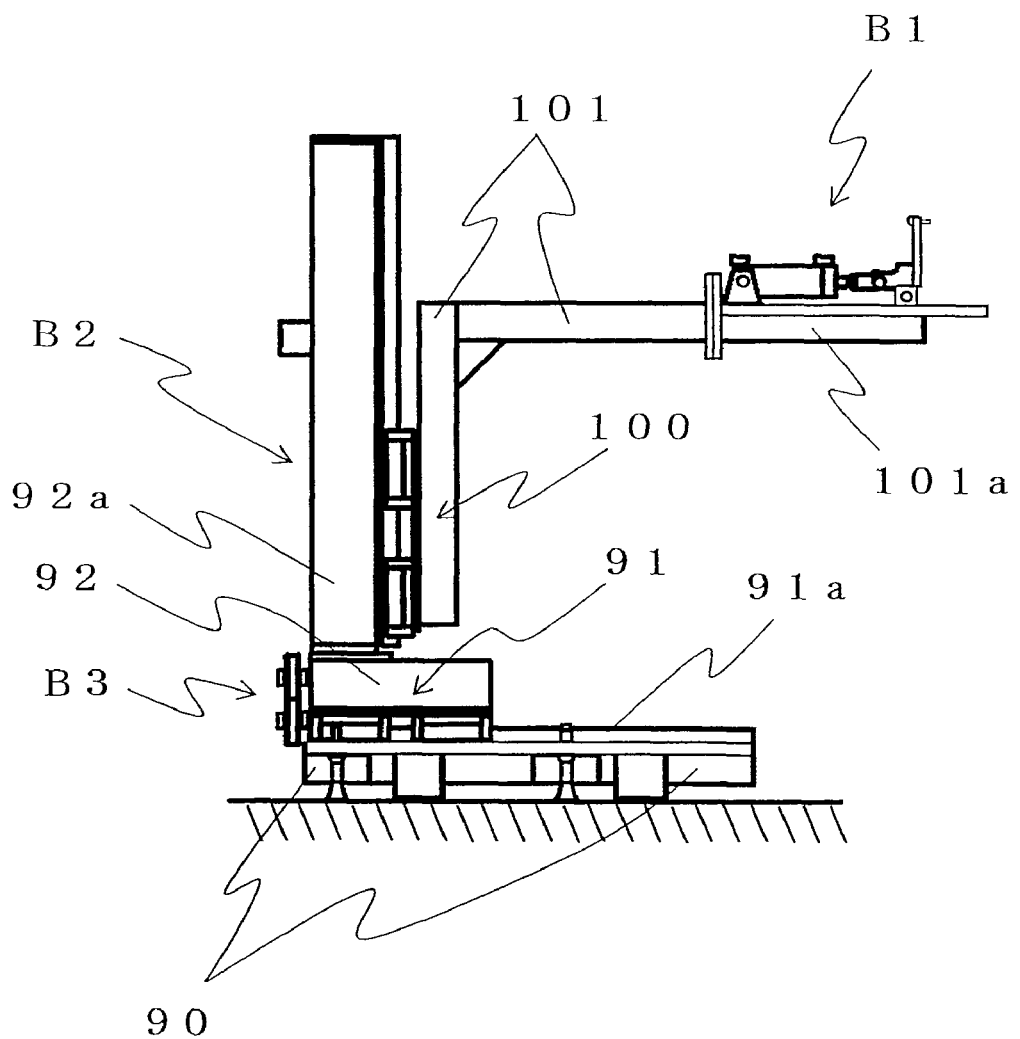
FIG. 11 is a side view of FIG. 8.

As shown in FIGS. 6 and 7, the first clamp-hoisting mechanism A2 has a fixed frame 50, which has a hollow structure, wherein an actuator, such as an air cylinder 52, is installed facing downward by means of a bracket 51, and the first clamping means A1 is fixed to the end-arm 53a of a movable frame 53. The fixed frame 50 and the movable frame 53 are connected by means of two linear guides 55 in such a way that they are movable in the direction to which they are lifted or lowered. The air cylinder 52 and the movable frame 53 are connected by a floating joint 56, which can absorb any deviation of the axis.

To the air inlet 57 of the air cylinder 52 are supplied two types of air, i.e., high air pressure and balanced air pressure (which balanced air pressure corresponds to one that can support the weight of the thermoplastic sheet material S). An air inlet 58 is open to the atmosphere. The air to the first clamping means A1 is supplied by air hoses 60 connected to it by two pairs of retractable spiral hoses 59. Symbol S in the figures denotes the thermoplastic sheet material. In the present embodiment, the air cylinder 52 is used for the first clamp-hoisting mechanism A2. However, in the present invention the first clamp-hoisting mechanism is not limited to the air cylinder. A servomotor and a ball screw mechanism can also be used in place of the air cylinder.

As shown in FIG. 7, in the first clamping means A1, a bearing metal 73 of a pin 72 of the actuator, such as an air cylinder 71, and a bearing metal 76 of a pin 75 of a holding member 74, are fixed to the base 70. A knuckle joint 77 is fastened at the end of the rod of the air cylinder 71 and is rotatably connected to the holding member 74 by a pin 78. To the holding member 74 is fastened a pin 79 with an acute edge by means of a nut 80, which pin is for fastening the thermoplastic sheet material S. Opening or closing the holding member 74 of the first clamping means A1 can be carried out either by supplying air to an air inlet 81, thus making the clamp close, or by supplying air to an air inlet 82, thus making the clamp open.

By referring to FIGS. 8-11, the rear and front clamping devices Ba, Bb are now explained. Only the rear and front clamping device Bb is explained, because the rear and front clamping devices Ba, and Bb can have the same structure.

The second width-adjusting mechanism B3 comprises a pair of linear guides 91 that are placed on a base frame 90, a ball screw mechanism 94 which is supported by two bearings 93 in the middle of the linear guides 91, and a servomotor 96. These linear guides 91 are connected to the running frame 92 that runs backward and forward. The symbol 91a in the figures denotes a rail. The timing belt 98 is wound around a belt pulley 95 disposed at the end of the axis of a ball-screw mechanism 94 and a belt pulley 97 disposed at the end of the axis of a servomotor 96, which rotates the ball-screw mechanism 94 in forward and reverse directions, such that the timing belt 98 transmits the driving force.

The axis of the ball screw mechanism 94 and that of the belt pulley 93, and the axis of the servomotor 96 and that of the belt pulley 97, are each fastened by a locking means (not shown).

Also, a position sensor 99 that detects the initial position is installed on the base frame 90.

The second clamp-hoisting mechanism B2 comprises a linear guide 100 attached to the side of a support 92a of the running frame 92, a pair of hoisting frames 101 fastened to the linear guide 100, a ball-screw mechanism 103 supported by two bearings 102 and a servomotor 105.

A timing belt 107 is wound around a belt pulley 104 disposed at the end of the axis of the ball screw mechanism 103 and a belt pulley 106 disposed at the end of the axis of the servomotor 105, which rotates the ball screw mechanism 103 in forward and reverse directions, such that the timing belt 107 transmits the driving force.

The axis of the ball-screw mechanism 103 and that of the belt pulley 104, and the axis of the servomotor 105 and that of the belt pulley 106, are each fastened by a locking means (not shown).

A position sensor 108 that detects the initial position is installed on the support 92a of the running frame 92, and a detection part (not shown) is attached to the hoisting frame 101.

In the present embodiment, the second clamping means B1 is attached to the arm 101a of the frame 101, which can run vertically. Its position is adjustable. The structure of the second clamping means B1 is the same as that of the first clamping means A1. So, a detailed explanation about the second clamping means B1 is omitted.

Any control device may be used as the control device D if it can control the movements of a pair of the width-clamping devices Aa, Ab and a pair of the rear and front clamping devices Ba, Bb, depending on the shape of the upper die M1.

Figure 12:
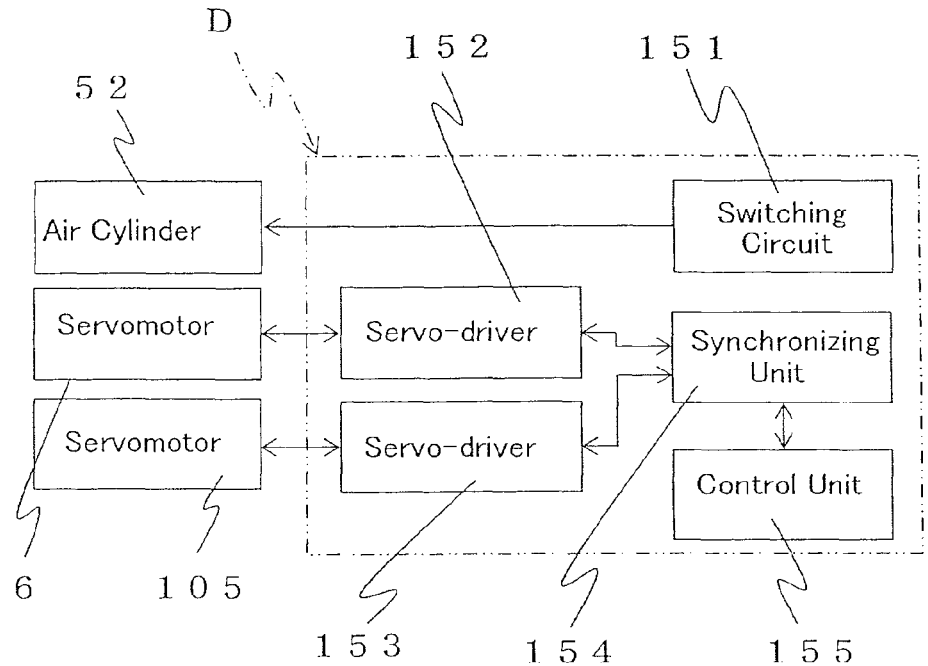
FIG. 12 is a block diagram of the control device.

Preferably it can control the movement such that the speed in which the upper die M1 is lowered, the speed at which the first clamp-hoisting mechanism A2 is lowered, and the speed at which the second clamp-hoisting mechanism B2 is lowered, are synchronized. For example, as shown in FIG. 12, the control device D can be constructed in a manner such that it comprises a switching circuit 151 for the control of the pressure of the air supplied to the air cylinder 52, servo-drivers 152, 153 for the servomotor 6, 105, and a synchronizing unit 154. Further it can include, for example, a programmable logic controller (PLC) that carries out sequence calculations and sends signals to the servo drivers 152 and 153 to have the speeds at which the upper die M1, the first clamp-hoisting mechanism A2, and the second clamp-hoisting mechanism B2, are lowered, be synchronized.

The synchronizing means in the embodiment of the present invention comprises the switching circuit 151 and the synchronizing unit 154, wherein first, by switching the pressure of the air cylinder 52 to the low balanced pressure, depending on the weight of the sheet material, it starts to have each air cylinder 52 lowered, followed by the synchronized movements of the servomotor 6 and servomotor 105, which lower the upper die M1 and the second clamping means B1. Thus the sheet material is pushed down in a movement that is synchronized with the lowering speed of the upper die, such that the sheet material can fit into the upper die.

Figure 13:
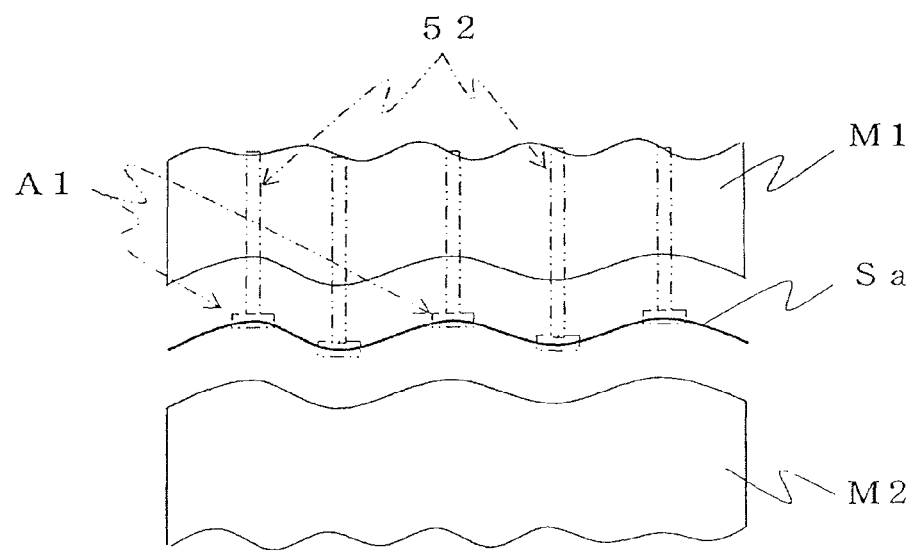
FIG. 13 shows a movement of the first clamping means.

As shown in FIG. 12, preferably the control device D comprises a control part 155, which independently controls the five first clamping means A1, which hold the edges Sa of the sides of the thermoplastic sheet material S, and the four second clamping means B1 (see FIG. 3), which hold the edges Sb of the sides of the thermoplastic sheet material S, based on the shape of the upper die M1. The symbol M2 in FIG. 13 denotes the lower die.

For example, the strokes of the first clamping means A1 can be adjusted by changing the air pressure of the air cylinder 52, which lifts and lowers each of the first clamping means A1.

Then, the stroke of each cylinder will be in an extended state if pressed by the upper die that is lowered.

The five first clamping means A1, which hold the sheet material, can each independently open so that the first clamping means, which holds the parts where a curvature of the sheet is greater and creases are likely to occur, can release the clamping of the sheet earlier. Further, as regards the four second clamping means B1, which hold the sheet material, the two inner clamps and the two outer clamps in the die are controlled by separate magnetic valves, and each set of them opens independently of other.

The control device D of the present embodiment has both the switching circuit 151 and the synchronizing unit 154 as a synchronizing means.

Any control device can be suitably selected if it can control the movements of hoisting, clamping, etc.

Below the operations of the material-clamping device thus constituted will be explained.

As shown in FIGS. 1 and 2, first, an operator (not shown) places a piece of felt F at a predetermined position on the lower die M2, and starts the operation. Both edges Sa of the longer sides of the thermoplastic sheet material S, (which material is heated in advance in a furnace [not shown] to a predetermined temperature and softened), are held by the first clamping means A1 after the first clamp-hoisting mechanism A2 is contracted to the predetermined position. The first clamp-hoisting mechanism A2 is contracted by means of the servomotor 27 and by the ball-screw mechanism 25 of a pair of the width-clamping devices Aa, Ab, which devices can freely lower the thermoplastic sheet material, and which devices can adjust its width. Then the material is transferred to the forming machine M, by means of the drive belt 10 that turns in a positive direction.

Then the second clamping means B1 of a pair of the rear and front clamping devices Ba and Bb is lifted to a level where the second clamping means B1 does not interfere with the upper surface of the lower die M2, if the second clamping means B1 moves horizontally. Then the rear and front clamping means B1 contracts to the point where it can hold the thermoplastic sheet material S. Then the second clamping means B1 is lifted to the point where the clamping means B1 can hold the edges Sb of the sides of the thermoplastic sheet material S. Then the second clamping means B1 enlarges it so that it is bigger than the lower die M2, because the second clamping means B1 does not interfere with the lower die M2.

Then the electric actuator 3 is extended and at the same time the pressure of the air supplied to the air cylinder 52 of the first clamp-hoisting mechanism A2 is switched to a low balanced pressure. Then after each air cylinder 52 is lowered in accordance with the weight of the sheet material, the upper die M1 presses down the thermoplastic sheet material S.

Also, the second clamping means B1 is lowered, while a synchronizing signal is given to the servomotor 105 of the rear and front clamping devices Ba, Bb, and the servomotor 6 of the electric actuator 3, such that the speed at which the upper die M1 is lowered and the speed at which the second clamp-hoisting mechanism A2 is lowered are synchronized.

Then, when the upper die M1 is lowered to the bottom dead point, a servomotor 27 is activated after the clamping of the edges Sa by the first clamping means A1 of the first clamp hoisting mechanism A2 is released. Then the first clamp-hoisting mechanism A2 is extended to the predetermined width, and lifted to its maximum allowable height after the air pressure supplied to the first clamp hoisting mechanism A2 is switched to a high pressure.

Then, a pair of the width-clamping devices Aa, Ab are transported to the furnace by turning a drive belt 10 in the reverse direction. At the same time a pair of the rear and front clamping devices Ba, Bb are kept in a waiting position after they release the clamping of the edges Sb of the sides of the sheet material held by the second clamping means B1.

Then, after the pressing for a required time has been completed, the upper die M1 is lifted to its maximum allowable height, by contracting the electric actuator 3, and the operator takes out the product from the lower die M2, and completes the forming process.

As is clear from the foregoing explanation, in the embodiment of the present invention, by holding the heated and softened thermoplastic sheet material S, with a pair of width-clamping devices Aa, Ab and a pair of the rear and front-clamping devices Ba, Bb, and by synchronizing the speed of lowering the thermoplastic sheet material S with the speed of lowering the upper die M1 based on the shape of the upper die M1, it is possible to manufacture a product that has no creases, even if the thermoplastic sheet material has a complex shape. Thus the advantages of the present invention, if applied to industrial use, such as improving a yield of a product, etc, are great.

The basic Japanese Patent Application, No. 2007-274678, filed on Oct. 23, 2007, is hereby incorporated in its entirety by reference, in the present application.

The present invention will become more fully understood from the detailed description of this specification. However, the detailed description and the specific embodiment are illustrations of desired embodiments of the present invention and are described only for the purpose of explanation. Various possible changes and modifications will be apparent to those of ordinary skill in the art on the basis of the detailed description.

The applicant has no intention to dedicate to the public any disclosed embodiments. Among the disclosed changes and modifications, those that may not literally fall within the scope of the present claims constitute, therefore, a part of the present invention in the sense of the doctrine of equivalents.

The use of the words "a" and "an" and "the" and similar referents in the specification and claims are to be construed to cover both the singular and the plural, unless otherwise indicated herein or clearly contradicted by the context. The use of any and all examples, or exemplary language (e.g., "such as") provided herein, is intended merely to better illuminate the invention and does not pose a limitation on the scope of the invention, unless otherwise claimed.

The invention claimed is:

1. A material-clamping unit for a forming machine that forms thermoplastic sheet material by an upper and a lower die, which sheet material is heated in advance to a predetermined temperature in a heating furnace, and thus softened, comprising:

a pair of width-clamping devices having a plurality of first clamping means that are disposed along edges of first sides of the thermoplastic sheet material and that hold the edges of the first sides in a running direction in which a thermoplastic sheet material runs, a first clamp-hoisting mechanism that lifts and lowers each of the first clamping means and the thermoplastic sheet material held therebetween, each of the plurality of first clamping means being able to independently open or close and thereby independently release or hold, respectively, the edges of the first sides of the thermoplastic sheet material, and a first width-adjusting mechanism that adjusts the width of the plurality of first clamping means by moving the first clamp-hoisting mechanism in the width direction, which is perpendicular to the running direction of the thermoplastic sheet material;

a pair of front and rear clamping devices having a plurality of second clamping means that are disposed at a front and rear position of the lower die of the forming machine, and that hold edges of second sides of the thermoplastic sheet material, which second sides are perpendicular to the running direction of the thermoplastic sheet material, a second clamp-hoisting mechanism that lifts and lowers each of the second clamping means and the thermoplastic sheet material held therebetween, and a second width-adjusting mechanism that adjusts the rear and front width of the plurality of second clamping means in the running direction by moving the second clamp-hoisting mechanism in the running direction of the thermoplastic sheet material;

a transfer mechanism that transfers the pair of the width-clamping devices into and out of a position between the upper and the lower dies of the forming machine;

a control device that controls, depending on a shape of the upper die, movements of the pair of the width-clamping devices and the pair of the rear and front clamping devices and a synchronizing means for synchronizing a speed at which the upper die is lowered, the speed at which the first clamp-hoisting mechanism is lowered, and the speed at which the second clamp-hoisting mechanism is lowered.

2. The material-clamping unit of claim 1, wherein a certain number of the first clamping means, and a certain number of the second clamping means independently control the clamping of the thermoplastic sheet material such that the thermoplastic sheet material can fit in the upper die.

* * * * *